(12) United States Patent
Nakagoshi

(10) Patent No.: US 6,807,006 B2
(45) Date of Patent: Oct. 19, 2004

(54) METHOD OF MANUFACTURING POLARIZED SPECTACLE LENS

(75) Inventor: Yasunobu Nakagoshi, Kobe (JP)

(73) Assignee: Hiroshi Kawahara, Sabae (JP)

(*) Notice: Subject to any disclaimer, the term of this patent is extended or adjusted under 35 U.S.C. 154(b) by 0 days.

(21) Appl. No.: 10/396,029

(22) Filed: Mar. 25, 2003

(65) Prior Publication Data

US 2003/0184863 A1 Oct. 2, 2003

Related U.S. Application Data

(63) Continuation-in-part of application No. 09/957,723, filed on Sep. 21, 2001, now Pat. No. 6,650,473.

(30) Foreign Application Priority Data

Dec. 22, 2000 (JP) ........................................ 2000-404559

(51) Int. Cl.[7] .............................. G02B 5/30; G02C 7/12
(52) U.S. Cl. ..................... 359/490; 359/491; 359/900; 351/49; 351/163; 351/177; 264/1.32; 264/2.7; 264/478; 264/259; 264/266; 264/328.1; 264/331.19
(58) Field of Search ................................ 359/483, 485, 359/488, 490, 491, 492, 493, 900; 351/49, 163, 165, 177; 264/1.31, 1.32, 134, 1.7, 2.7, 478, 479, 645, 241, 259, 266, 328.1, 331.19

(56) References Cited

U.S. PATENT DOCUMENTS

| | | | |
|---|---|---|---|
| 2,263,249 A | * 11/1941 | Rogers |
| 3,560,076 A | * 2/1971 | Cepps |
| 3,720,555 A | * 3/1973 | Cepps |
| 5,232,637 A | * 8/1993 | Dasher et al. |
| 5,412,505 A | * 5/1995 | Van Ligten et al. |
| 5,434,707 A | * 7/1995 | Dalzell et al. |
| 5,805,336 A | * 9/1998 | Dalzell et al. |
| 5,856,860 A | 1/1999 | Bhalakia et al. |
| 6,177,032 B1 | * 1/2001 | Smith et al. |
| 6,220,703 B1 | * 4/2001 | Evans et al. |
| 6,650,473 B2 | * 11/2003 | Nakagoshi |

FOREIGN PATENT DOCUMENTS

JP 2001353747 12/2001

* cited by examiner

Primary Examiner—Ricky D. Shafer
(74) Attorney, Agent, or Firm—Duane Martin LLP

(57) ABSTRACT

A film of a plastic material fusible with a lens-forming material and having a high light transmissivity is bonded and laminated, with an adhesive, to a polarizing sheet having a polarization coefficient of 99.0% or higher and a light transmissivity of 40% or higher. The resultant laminate is hot-pressed into a shape similar to an aimed lens. The hot-pressed laminate is placed in a lens forming mold cavity, and a lens-forming resin which has been colored or of which light transmissivity has been adjusted to a desired transmissivity is injected into the cavity to thereby form a polarized lens.

9 Claims, 1 Drawing Sheet

METHOD OF MANUFACTURING POLARIZED SPECTACLE LENS

This application is a Continuation-In-Part application of patent application Ser. No. 09/957,723, filed on Sep. 21, 2001, now U.S. Pat. No. 6,650,473.

This invention relates to a method for manufacturing polarized spectacle lenses having a high polarization coefficient.

BACKGROUND OF THE INVENTION

Polarizing lenses made of glass have been manufactured for a long time. A glass polarized lens is formed by placing a polarizing film and a bonding agent between two glass lenses and pressing them together. Recently, in order to light-weight spectacle lenses and to avoid damages to eyes by broken lenses, lenses have been made of plastic materials.

Examples of methods for manufacturing plastic lenses are as follows.

(1) A casting method as disclosed in, for example, Japanese Patent Application Publication No. SHO 47-35050 A, according to which method a polarizing film preformed to have a spherical surface is placed in a cavity formed by molds having concave and convex inner surfaces, and a polymerizable plastic monomer, e.g. diethylene glycol biscarbonate, is injected on opposite sides of the polarizing film and polymerized.

(2) A press molding method as disclosed in Japanese Patent Publication No. SHO 50-3656 B, according to which thermoplastic sheets having different thicknesses are placed on opposite sides of a polarizing film and compressed.

(3) A method as disclosed in Japanese Patent Application Publication No. SHO 56-13139 A, according to which a polarized plastic lens is fabricated by the use of a polarizing sheet formed of a polarizer directly bonded to a fusible material.

(4) A method as disclosed in Japanese Patent Application Publication No. SHO 64-22538, according to which a polarized polycarbonate lens is fabricated by stacking a polarizing film and polycarbonate films or sheets with the polarizing film disposed between the polycarbonate films to thereby provide a laminate having a thickness of 0.5–2.5 mm, and the laminate is hot-molded under pressure.

These methods, however, have disadvantages. For example, they require a long manufacturing time; the polarizing sheets are of special structure and, therefore, expensive; deformation may be introduced when sheets are subjected to thermal formation; and manufacturing lenses of different colors requires a corresponding number of colored polarizing sheets. Also, polarized lenses manufactured by the prior art methods are poor in impact resistance.

In order to overcome these problems, a method in which polyurethane resin is cast has been recently employed, but lenses manufactured by the casting method are expensive.

Many of optical lenses can hardly block selectively light in a wavelength region around 580 nanometers which makes human feel glare. Conventionally, in order to reduce glare, glass lenses have employed transition-metal compounds which are stable at a melting temperature of glass. Some types of plastic lens are formed of plastics, e.g. diethylene glycol biscarbonate, which can be injection-molded at a temperature of 100° C. or below. Transition-metal oxides compatible with such injection-moldable plastics have a thermal decomposition temperature lower than the molding temperature of the plastics and, therefore, cannot be used for the purpose of glare reduction of plastic lenses.

An object of the present invention is to provide a method of economically manufacturing polarized spectacle lenses having high impact resistance and good optical characteristics. The method according to the present invention makes it possible to manufacture polarized spectacle lenses of various colors and light transmissivity using a single type of polarizing film.

SUMMARY OF THE INVENTION

The present invention can solve the above-described various problems by providing a new method for manufacturing polarized spectacle lenses. According to the invention, a polarizing film having a high light transmissivity and a polarization coefficient or degree of polarization extremely close to 100%, prepared by technologies used in making liquid display devices, which have made remarkable progress recently, is sandwiched between cellulose resin films to form a polarizing sheet. A plastic film, e.g. a polyurethane film, which is optically transparent and compatible and fusible with a plastic lens molding material, is placed on one surface of the polarizing sheet with an adhesive disposed between them. The resulting laminate is hot-pressed to have a surface contour conformable with the final shape of the lens, and the hot-pressed laminate is shaped, e.g. punched, into a shape conformable with the lens forming mold cavity. Then, the shaped laminate is placed in the cavity with the plastic film facing inward of the cavity. Thereafter, a plastic lens-molding material is injected into the cavity to complete the plastic polarized spectacle lens.

A polarizing sheet is formed by bonding, with an adhesive, a film of a cellulose resin selected from a group consisting of cellulose triacetate and cellulose acetate butyrate, on each of opposite surfaces of a polarizing film. The resulting polarizing sheet has a thickness of 0.2 mm or smaller, a light transmissivity of 40% or higher, and a polarization coefficient of 99.0% or higher. A plastic film having a thickness of from 0.1 mm to 0.5 mm and a light transmissivity of 80% or higher is stacked on and bonded to the polarizing sheet with an adhesive. The resulting stack or laminate is hot-pressed to have a surface contour similar to the surface contour of an ultimate lens. The hot-press shaped laminate is placed in a mold cavity with the plastic film facing inward, and a lens forming resin which can be fused with the plastic film is injected to complete the aimed polarized spectacle lens.

When polyurethane is used for the plastic film to be stacked on one surface of the polarizing film, it can be formed to have a thickness of from 0.1 mm to 0.5 mm. Further, when polyurethane resin is used as the lens molding material, a transition-metal compound can be mixed into the polyurethane resin.

BRIEF DESCRIPTION OF THE DRAWING

The same or similar reference numerals represent the same or similar components or films.

DETAILED DESCRIPTION OF THE INVENTION

Figure 1:
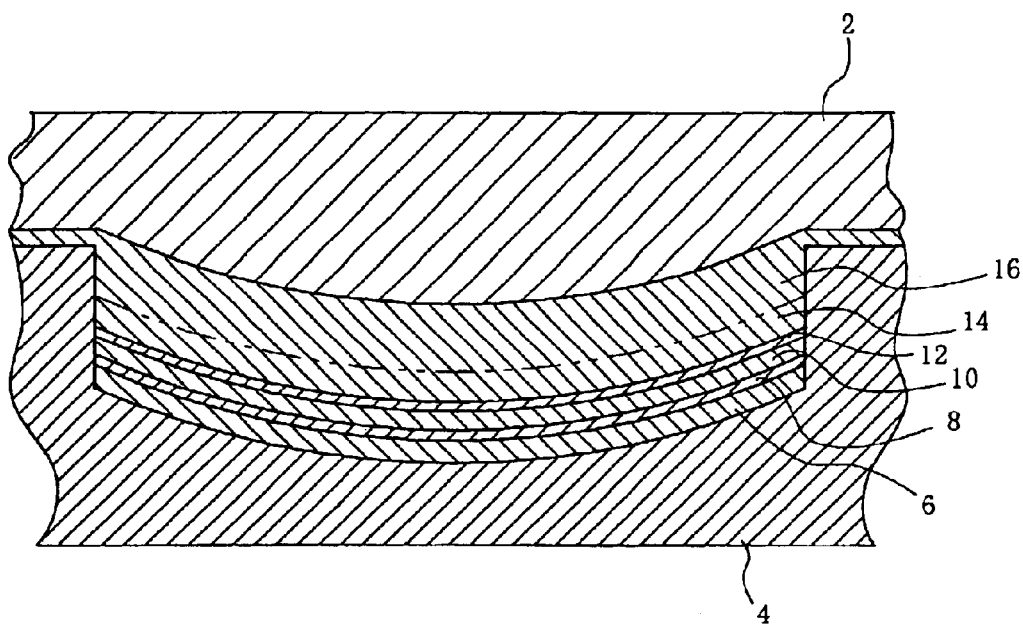
FIG. 1 is a schematic cross-sectional view of lens forming molds forming a cavity in which a hot-pressed laminate including a polarizing sheet with cellulose resin films bonded to the opposite surfaces, and a plastic film bonded to one of the cellulose resin films is placed, and a lens forming resin has been injected over the plastic film, the plastic film providing a concave surface to the laminate.
Figure 2:
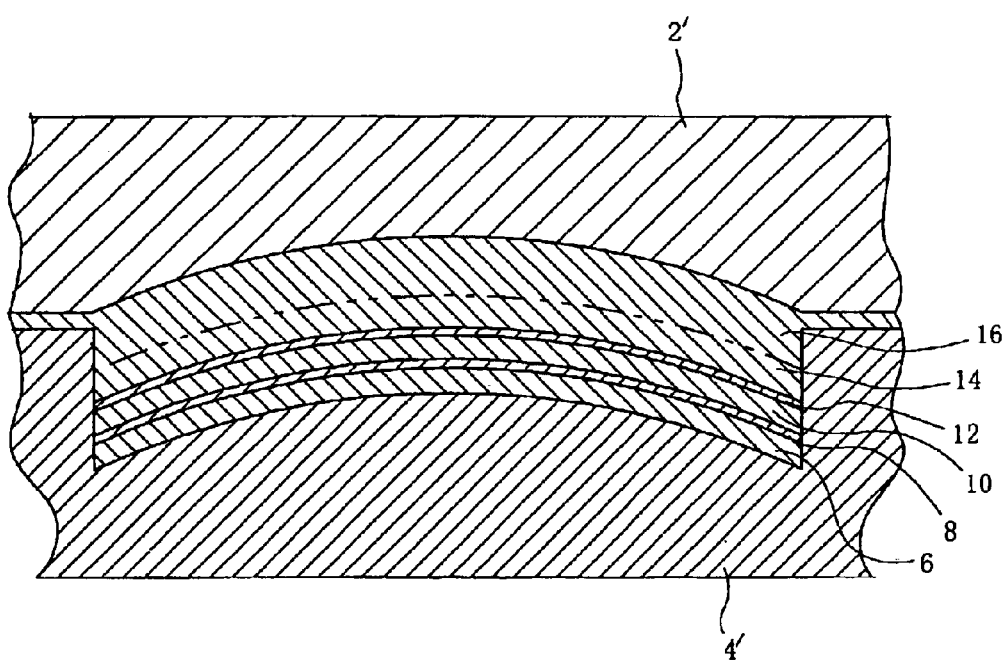
FIG. 2 is a schematic cross-sectional view similar to the one shown in FIG. 1, but the plastic film providing a convex surface to the laminate.

Now, the present invention is described in detail with reference to the accompanying FIGS. 1 and 2.

The polarizing sheet (6, 8, 10) useable in the present invention is formed, for example, of a polarizing film 8 and an optically highly transparent cellulose resin film 6 (10) bonded, with an adhesive, to each of opposing surfaces of the polarizing film. The cellulose resin is selected from a group consisting of cellulose triacetate and cellulose acetate butyrate. The polarizing film 8 is formed of a base film which is a polyvinyl alcohol film dyed with a dichromatic dyestuff having resistance to moist heat and stretched or oriented. The polarizing sheet has a thickness of 0.2 mm or less, a light transmissivity of 40% or larger, and a polarization coefficient of 99.0% or higher.

The thickness of the polarizing sheet is kept to be 0.2 mm or smaller so that the light transmissivity can be easily kept to be 40% or higher that the cost for the materials used can be optimized.

A plastic film 14 which has a light transmissivity of 80% or higher and a thickness in a range of from 0.1 mm to 0.5 mm is formed basically of a resin which is compatible and fusible with a lens forming resin 16. Generally, a resin, e.g. polyester, polyether, polyacryl, polycarbonate, polyamide, cellulose or polyurethane, may be used singly or in the form of modified resin.

The plastic film 14 is bonded to the polarizing sheet and, then, is subjected to hot bending. If the thickness of the plastic film 14 is larger than 0.5 mm, molecular stresses tend to be produced in the film during the hot bending, which degrades the optical properties of the film. To avoid such molecular stresses, the hot bending must be performed in a long time, which would degrade the lens manufacturing economy.

In case a polyurethane resin is used as the plastic film 14 laminated to the polarizing sheet (6, 8, 10), it is preferable that the polyurethane film should have a light transmissivity of 80% or more and a thickness in a range of from 0.1 mm to 0.5 mm, preferably from 1.0 mm to 0.3 mm. If the polyurethane film of greater than 0.5 mm thick is bonded to a polarizing sheet, it is hard to hot-press them because such polyurethane film has high elasticity. This is the reason why the thickness of not greater than 0.5 mm is preferable.

The reason why the thickness of the plastic film 14 is preferably not smaller than 0.1 mm is as follows. After the polarizing sheet (6, 8, 10) with the plastic film 14 bonded to it is hot-pressed, it is placed in the molding cavity formed between lens forming molds 2 and 4 in FIG. 1, or molds 2' and 4' in FIG. 2, and a lens forming resin 16 at a high temperature is injected into the cavity. The plastic film 14 at the interface with the hot lens forming resin 16 melts and fuse with the film forming resin 16. If the plastic film 14 is less than 0.1 mm thick, the polarizing sheet (6, 8, 10) is damaged due to the heat and pressure of the lens forming resin 16 and shearing force exerted to the film by the flow of the resin within the cavity, which are transmitted to the polarizing sheet (6, 8, 10) through the thin plastic film 14.

A polyurethane resin film may be used as the plastic film 14. In this case, polyurethane is used as the lens-forming resin 16. The polyurethane resin useable for the plastic film 14 includes, for example, polyester-polyurethane and polyether-polyurethane, which are compatible and fusible with the lens forming polyurethane resin 16. Such resin may be used singly or in the form of modified resin.

The adhesive 12 for bonding the polarization sheet (6, 8, 10) and the plastic film 14 must be highly transparent and, in addition, have extensibility against the hot-pressing treatment, thermal resistance against heat during the molding and other properties meeting various requirements for lenses which should be used in various conditions. Also, it must provide sufficient adhesion between the plastic film which can be formed of various plastic materials and the cellulose resin film of the polarizing sheet.

The adhesive 12 useable in the present invention includes a two-part adhesive which is composed of a polyol including, as its main constituent, a polyester-urethane resin, a polyether-urethane resin or polyester-polyether-urethane resin, having an average molecular weight of between 10,000 and 20,000 inclusive, and polyisocyanate acting as a crosslinkable curing agent.

The lens forming resin 16 useable in the present invention includes polycarbonate, polyacryl, polyamide, cellulose, polyester, polyallyl, polyester-urethane and polyether-urethane resins, which may be selected, depending on a desired purpose. The lens-forming resin 16 may be colored with appropriate materials so as to provide polarized spectacle lenses of various colors.

When polyurethane resin is used as the lens-forming material, the molding temperature can be lower than that employed when polycarbonate resin and polyacrylic resin are used, by from 50° C. to 70° C., which usually is from about 150° C. to about 220° C. Accordingly, a transition-metal compound can be used together, which can selectively absorb glare-inducing light of wavelengths around 580 nanometers, and can provide vivid colors. Thus, high-quality lenses can be economically manufactured.

The transition-metal compound which can be added to the polyurethane lens forming resin includes cerium tris (acetylacetonato), cerium acetate, neodymium tris (acetylacetonato) and neodymium acetate.

EXAMPLE 1

A polycarbonate film 14 having a thickness of 0.15 mm and a light transmissivity of 92% was laminated and bonded to a polarizing sheet (6, 8, 10) (SUMIKALAN® SQ-1852AP commercially available from Sumitomo Chemical Company, Limited) having a thickness of 0.18 mm and a light transmissivity of 43.7%, using a two-part polyether-polyurethane adhesive. SUMIKALAN® SQ-1852AP is a polarizing sheet prepared by bonding a cellulose triacetate film 6 (10) having a thickness of 0.08 mm onto each of opposing surfaces of a polarizing film 8 of polyvinyl alcohol dyed with an iodine-type dye stuff having a thickness of 0.02 mm and a polarization coefficient or degree of polarization of 99.95%.

The resulting laminate had a thickness of about 0.34 mm. The laminate was placed between concave and convex hot-pressing plates (not shown) having surface contours conformable with an aimed lens, with the polycarbonate film 14 facing to the concave plate. The laminate was formed under heat and pressure at 135° C. for two minutes, and the lens-shaped laminate was punched from the formed laminate. The lens-shaped laminate was, then, placed in a cavity formed by lens forming molds 2 and 4 in FIG. 1, or 2' and 4' in FIG. 2. Then, a lens-forming polycarbonate resin 16 was injected into the cavity, which provided the aimed polycarbonate polarized lens.

Since the injected molten lens-forming polycarbonate resin 16 fused with the polycarbonate film 14 bonded to the polarizing sheet into a solid unitary molding, the resulting polarized lens exhibited optically superior properties. The lens exhibited a polarization coefficient of higher than 99.0% and a light transmissivity of 40.0%.

EXAMPLE 2

The same laminate as Example 1 was prepared. A polycarbonate resin 16 colored with a pigment to thereby exhibit a light transmissivity of 60.0% was injected as the lens-forming resin in the same manner as in Example 1. A color polarized lens having a light transmissivity of 25.0% and a polarization coefficient of 99.0% was obtained.

EXAMPLE 3

A polyester film 14 having a thickness of 0.18 mm and a light transmissivity of 85% was laminated and bonded to the same polarizing sheet (6, 8, 10) (SUMIKALAN® SQ-1852AP) as used in Example 1 with a two-part polyester-polyurethane adhesive 12. The laminate was placed between concave and convex hot-pressing plates having surface contours conformable with an aimed lens. The laminate was formed under heat and pressure at 130° C. for two minutes, and the lens-shaped laminate was punched from the formed laminate. The lens-shaped laminate was, then, placed in a lens molding cavity, as in Example 1. Then, a polyester resin 16 for optical use was injected into the cavity, which provided the aimed polyester polarized lens. The obtained polyester polarized lens exhibited a polarization coefficient of 99.2% and a light transmissivity of 39.5%.

EXAMPLE 4

A polyether-polyurethane film 14 having a thickness of 0.15 mm and a light transmissivity of 85% was laminated and bonded to the polarizing sheet (6, 8, 10) (SUMIKALAN® SQ-1852AP) same as the one used in Example 1, with a two-part polyether-polyurethane adhesive 12. The resulting laminate had a thickness of about 0.34 mm. The laminate was placed between concave and convex hot-pressing plates having surface contours conformable with an aimed lens, with the polyether-polyurethane film facing to the concave plate. The laminate was formed under heat and pressure at 160° C. for two minutes, and the lens-shaped laminate was punched from the formed laminate. The lens-shaped laminate was, then, placed in a lens forming mold cavity, formed by molds 2 and 4 in FIG. 1, or molds 2' and 4' in FIG. 2. Then, a polyether-polyurethane resin 16 having a glass transition temperature of –10° C. was injected into the cavity, to thereby provide a polarized lens. Since the injected molten lens-forming polyurethane resin 16 fused with the polyurethane film 14 bonded to the polarizing sheet into a solid unitary molding, the resulting polarized lens exhibited optically superior properties. The lens exhibited a polarization coefficient of higher than 99.0% and a light transmissivity of 38.0%, and had no distortion. Also, it was not broken at all in an Izod impact test carried out at –30° C. and, thus, exhibited a good impact resistance.

EXAMPLE 5

Polyether-polyurethane resin 14 same as used in Example 4 was colored with a pigment to have a light transmissivity of 60.0%. A color polarized lens was prepared in the same manner as Example 4, with the pigmented polyether-polyurethane resin used as the lens-forming resin 16. The resulting polarized lens exhibited a light transmissivity of 25.0% and a polarization coefficient of 99.0%.

EXAMPLE 6

One hundred (100) parts by weight of the polyether-polyurethane resin used in Example 4 was kneaded with 15 parts by weight of neodymium tris(acetylacetonato). A polarized lens was prepared in the same manner as Example 4 with the polyether-polyurethane resin with neodymium tris(acetylacetonato) used as the lens-forming resin 16. The light absorption of the resultant polarized lens was tested. Light at wavelengths about 580 nanometers was found to have been reduced by 60% relative to the polarized lens formed without neodymium tris(acetylacetonato).

EXAMPLE 7

A polyester-polyurethane film 14 having a thickness of 0.20 mm and a light transmissivity of 85% was laminated and bonded to the same polarizing sheet (6, 8, 10) (SUMIKALAN® SQ-1852AP) as used in Example 4 with a two-part polyester-polyurethane adhesive 12. The laminate was placed between concave and convex hot-pressing plates (not shown) having surface contours conformable with an aimed lens. The laminate was formed under heat and pressure at 150° C. for two minutes, and the lens-shaped laminate was punched from the formed laminate. As in Example 4, the lens-shaped laminate was placed in a lens forming mold cavity formed by molds 2 and 4 in FIG. 1, or molds 2' and 4' in FIG. 2. Then, a polyester-polyurethane resin 16 having a glass transition temperature of 15° C. was injected into the cavity, to thereby form a polarized lens. The lens exhibited a polarization coefficient of 99.2% and a light transmissivity of 39.5%. Also, it was not broken at all in an Izod impact test carried out at –30° C.

What is claimed is:

1. A method of manufacturing a polarized spectacle lens, comprising: bonding, with an adhesive, a plastic film having a thickness in a range of from 0.1 mm to 0.5 mm to one of opposing surfaces of a polarizing sheet to thereby form a laminate, said polarizing sheet comprising a polarizing film with a film of a material selected from a group consisting of cellulose triacetate and cellulose acetate butyrate bonded to each of opposing surfaces of said polarizing film, and having a thickness of not greater than 0.2 mm, a light transmissivity of 40% or higher and a polarization coefficient of 99.0% or higher; hot-pressing said laminate into a shape of which surface contours are similar to those of said spectacle lens; placing the hot-pressed laminate in a lens forming mold cavity with said plastic film facing inward of said cavity; and injecting a lens-forming resin fusible with said plastic film into said cavity.

2. The method according to claim 1 wherein said plastic film is a polyurethane resin, and said lens-forming resin is a polyurethane resin.

3. The method according to claim 2 wherein said polarizing film comprises a polyvinyl type film colored with a heat-resistant dichromatic dyestuff and stretched.

4. The method according to claim 2 wherein a transition-metal compound is mixed with said lens-forming polyurethane resin.

5. The method according to claim 1 wherein said polarizing film comprises a polyvinyl type film colored with a heat-resistant dichromatic dyestuff and stretched.

6. The method according to claim 1 wherein said hot pressing step comprises hot pressing said laminate into a shape wherein said plastic film forms a convex surface of said laminate.

7. A method of manufacturing a polarized spectacle lens, comprising: bonding, with an adhesive, a plastic film having a thickness in a range of from 0.1 mm to 0.5 mm to one of opposing surfaces of a polarizing sheet to thereby form a laminate, said polarizing sheet comprising a polarizing film and a film of a material selected from a group consisting of cellulose triacetate and cellulose acetate butyrate bonded to each of opposing surfaces of said polarizing film, and having a thickness of not greater than 0.2 mm. a light transmissivity of 40% higher and a polarization coefficient of 99.0% or higher; hot-pressing said laminate into a shape of which surface contours are similar to those of said spectacle lens: placing hot-pressed laminate in a lens forming mold cavity and said plastic film facing inward to said cavity: and injecting a lens-forming resin fusible with said plastic film into said cavity;

wherein said hot pressing step comprises hot pressing said laminate into a shape wherein said plastic film forms a concave surface of said laminate.

8. A polarized spectacle lens comprising:

a polarizing sheet comprising a polarizing film and a film of a material selected from a group consisting of cellulose triacetate and cellulose acetate butyrate bonded to each of opposing surfaces of said polarizing film, said polarizing sheet having a thickness of not greater than 0.2 mm, a light transmissivity of 40% or higher and a polarization coefficient of 99.0% or higher;

a plastic film having a thickness in a range of from 0.1 mm to 0.5 mm bonded to one of opposing surfaces of a polarizing sheet with an adhesive to thereby form a laminate; and a layer of a lens-forming resin fused with said plastic film.

9. A polarized spectacle lens comprising:

a polarizing sheet comprising a polarizing film and a film of a material selected from a group consisting of cellulose triacetate and cellulose acetate butyrate bonded to each of opposing surfaces of said polarizing film, said polarizing sheet having a thickness of not greater than 0.2 mm, a light transmissivity of 40% or higher and a polarization coefficient of 99.0% or higher;

a plastic film having a thickness in a range of from 0.1 mm to 0.5 mm bonded to one of opposing surfaces of a polarizing sheet with an adhesive to thereby form a laminate; and a layer of lens-forming resin fused with said plastic film;

wherein said plastic film is formed to form a concave surface of said laminate.

* * * * *